United States Patent
Salter et al.

(10) Patent No.: US 10,279,659 B2
(45) Date of Patent: May 7, 2019

(54) VEHICLE KEYPAD FORMED IN A WINDOW

(71) Applicant: Ford Global Technologies, LLC, Dearborn, MI (US)

(72) Inventors: Stuart C. Salter, White Lake, MI (US); Paul Kenneth Dellock, Northville, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 168 days.

(21) Appl. No.: 15/404,525

(22) Filed: Jan. 12, 2017

(65) Prior Publication Data

US 2018/0194203 A1 Jul. 12, 2018

(51) Int. Cl.
| | |
|---|---|
| *B60J 1/20* | (2006.01) |
| *B60R 25/23* | (2013.01) |
| *F21V 9/30* | (2018.01) |
| *G07C 9/00* | (2006.01) |
| *F21V 8/00* | (2006.01) |
| *F21W 107/10* | (2018.01) |
| *H01H 9/00* | (2006.01) |

(52) U.S. Cl.
CPC ............... *B60J 1/20* (2013.01); *F21V 9/30* (2018.02); *G07C 9/00* (2013.01); *G07C 9/0069* (2013.01); *F21W 2107/10* (2018.01); *G02B 6/006* (2013.01); *G02B 6/0036* (2013.01); *H01H 9/00* (2013.01)

(58) Field of Classification Search
CPC . B60J 1/20; E05B 17/10; G02B 6/006; F21W 2107/10; F21V 9/00; H01H 9/00; B60R 25/23; G07C 9/00; G07C 9/0069
See application file for complete search history.

(56) References Cited

U.S. PATENT DOCUMENTS

| | | | |
|---|---|---|---|
| 4,494,326 A * | 1/1985 | Kanamori | B60R 13/00 |
| | | | 315/87 |
| 4,754,255 A | 6/1988 | Sanders et al. | |
| 5,239,152 A | 8/1993 | Caldwell et al. | |
| 6,606,492 B1 | 8/2003 | Losey | |
| 6,617,975 B1 | 9/2003 | Burgess | |

(Continued)

FOREIGN PATENT DOCUMENTS

CN  101833404 A  9/2010

OTHER PUBLICATIONS

"Securicode Keyless Entry Keypad," https://owner.ford.com/how-tos/vehicle-features/locks-and-security/securicode-keyless-entry-keypad.html, Official Ford Owner Site, 6 pages, copyrighted 2016, Ford Motor Company.

(Continued)

*Primary Examiner* — Karabi Guharay

(74) *Attorney, Agent, or Firm* — Vichit Chea; Price Heneveld LLP

(57) ABSTRACT

A vehicle capacitive key input pad assembly includes a pad comprising a region defining an illuminated character. The assembly also includes a first electrode having electrode fingers and extending at least partially around the illuminated character region, and a second electrode having electrode fingers and at least partially extending into the character region. One or more electrode fingers trace a portion of the illuminated character.

18 Claims, 5 Drawing Sheets

(56) References Cited

U.S. PATENT DOCUMENTS

| | | | |
|---|---|---|---|
| 7,065,909 B2 * | 6/2006 | Snyder | G09F 21/02 40/542 |
| 7,151,351 B2 | 12/2006 | Piechowiak et al. | |
| 7,260,454 B2 | 8/2007 | Pickering et al. | |
| 7,733,332 B2 | 6/2010 | Steenwyk et al. | |
| 7,989,725 B2 | 8/2011 | Boddie et al. | |
| 8,279,194 B2 | 10/2012 | Kent et al. | |
| 8,330,385 B2 | 12/2012 | Salter et al. | |
| 8,400,265 B2 | 3/2013 | Sarioglu et al. | |
| 8,454,181 B2 | 6/2013 | Salter et al. | |
| 8,506,101 B2 | 8/2013 | Mathers et al. | |
| 8,514,545 B2 | 8/2013 | Haag | |
| 8,654,265 B2 | 2/2014 | Hung et al. | |
| 8,878,438 B2 | 11/2014 | Salter et al. | |
| 8,994,495 B2 | 3/2015 | Dassanayake et al. | |
| 9,199,608 B2 | 12/2015 | Newman et al. | |
| 2005/0190040 A1 | 9/2005 | Huntzicker et al. | |
| 2007/0194216 A1 | 8/2007 | Schwenke | |
| 2007/0295043 A1 * | 12/2007 | McDermott | B60R 25/00 70/255 |
| 2010/0296303 A1 * | 11/2010 | Sarioglu | E05B 17/10 362/487 |
| 2011/0291982 A1 | 12/2011 | Hsieh et al. | |
| 2014/0002405 A1 | 1/2014 | Salter et al. | |
| 2015/0180471 A1 | 6/2015 | Buttolo et al. | |
| 2015/0360647 A1 | 12/2015 | Mathews | |
| 2016/0371907 A1 | 12/2016 | Ma et al. | |
| 2017/0018129 A1 | 1/2017 | Huebner | |
| 2017/0204650 A1 | 7/2017 | Dezorzi et al. | |
| 2018/0062649 A1 * | 3/2018 | Salter | B60R 25/23 |

OTHER PUBLICATIONS

"Keyfree," www.keyfree.gr/index.php/productsgr/10-mkeyfree-touch, 6 pages, VSA Ltd., copyrighted Automotive Innovations.

"Touch Sensors Design Guide" by ATMEL, 10620 D-AT42-04/09, Revised Apr. 2009, 72 pages, Copyrighted 2008-2009 Atmel Corporation.

* cited by examiner

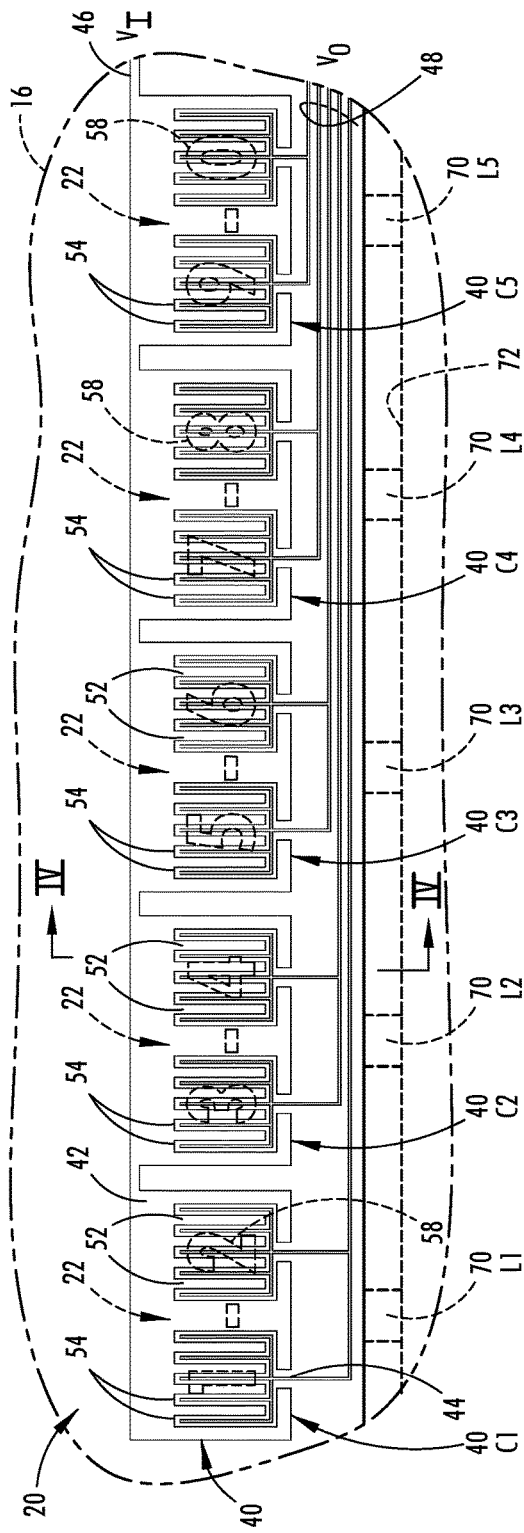
FIG. 3
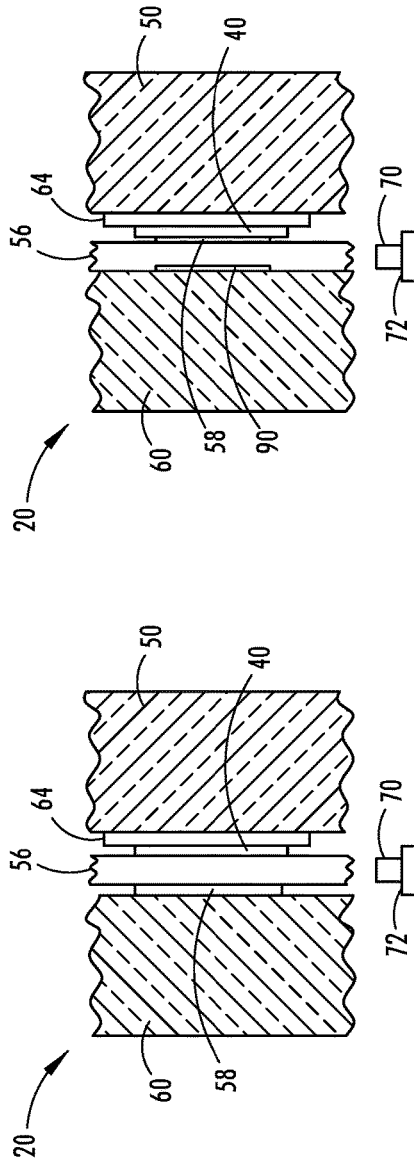
FIG. 4A
FIG. 4B

VEHICLE KEYPAD FORMED IN A WINDOW

FIELD OF THE INVENTION

The present invention generally relates to proximity sensor input devices, and more particularly relates to proximity sensor input pads on glass.

BACKGROUND OF THE INVENTION

Automotive vehicles are commonly equipped with various user actuatable input devices for entering inputs to control devices or functions. For example, keypads are often provided on the vehicle body exterior to enable a user to enter a sequence of inputs as a code to actuate a door lock without a mechanical key or key fob. Conventional keypads employed on motor vehicles typically include mechanical switches actuatable by users. It would be desirable to provide for an enhanced keypad assembly that is economical and offers enhanced and reliable performance.

SUMMARY OF THE INVENTION

According to one aspect of the present invention, an input pad assembly is provided. The input pad assembly includes a light transmissive medium, a proximity sensor positioned on the medium, a fluorescent pattern located on the medium, and a light source positioned near an edge of the medium to illuminate the pattern through the medium.

According to another aspect of the present invention, a vehicle input pad assembly is provided. The vehicle input pad assembly includes a vehicle window comprising a first layer and a second layer, and a proximity sensor positioned between the first and second layers. The vehicle input pad assembly also includes an illuminable fluorescent pattern positioned between the first and second layers, and a light source positioned to illuminate the illuminable pattern through the window.

According to a further aspect of the present invention, a vehicle input keypad assembly is provided. The vehicle input keypad assembly includes a vehicle window comprising first and second layers, and a proximity sensor positioned between the first and second layers. The vehicle input keypad assembly also includes a fluorescent illuminable pattern positioned between the first and second layers, and a light source positioned proximate to an edge of the window to illuminate the fluorescent illuminable pattern through the window.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a front view of the capacitive input keypad assembly shown in FIG. 2 further illustrating the transparent proximity sensors;

FIG. 4A is a cross-sectional view of the capacitive input keypad assembly taken through line IV-IV of FIG. 3, according to one embodiment;

FIG. 4B is a cross-sectional view of the capacitive input keypad assembly taken through line IV-IV of FIG. 2, according to another embodiment;

DETAILED DESCRIPTION OF THE PREFERRED EMBODIMENTS

Figure 1:
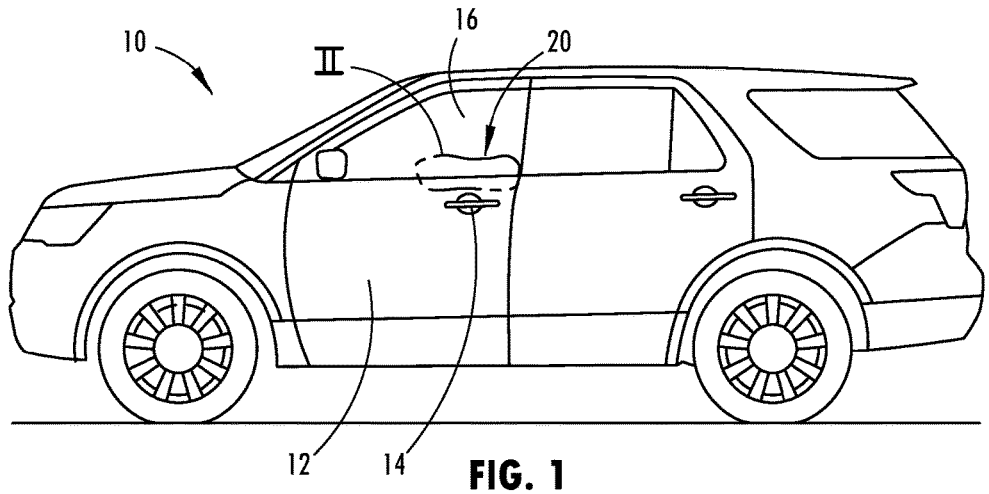
FIG. 1 is a side view of a motor vehicle equipped with a capacitive input keypad assembly for controlling the door locks on the vehicle, according to one embodiment.
Figure 2:
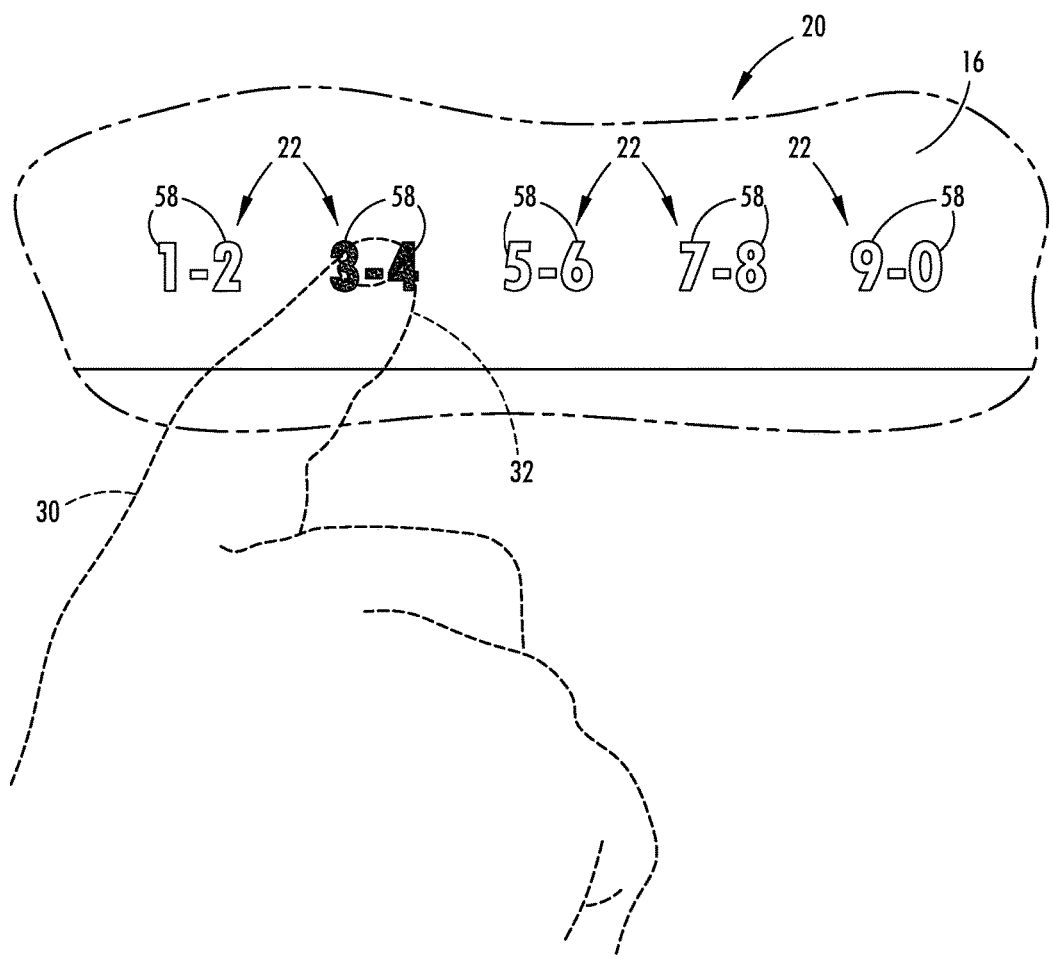
FIG. 2 is an enlarged view of section II of FIG. 1 further illustrating the capacitive input keypad assembly.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1 and 2, a wheeled motored vehicle 10 is generally illustrated having a capacitive input pad assembly 20 shown configured as a vehicle door access keypad assembly that enables a person to enter a sequence of inputs to lock and unlock the vehicle doors, according to one embodiment. The vehicle 10 includes a passenger door 12 provided on the vehicle body and a door latch lock assembly 14 positioned on the door 12. The door latch lock assembly 14 may be actuatable by a person to unlatch and thereby open the door 12 and to lock and unlock the door 12 and other doors on the vehicle to control access to the vehicle. It should be appreciated that a driver may actuate a door lock switch in the vehicle and may also be equipped with a key fob that may remotely lock and unlock the door latch lock assembly 14 of vehicle door 12. The capacitive input pad assembly 20 is configured with a plurality of user selectable input pads 22 (FIG. 2) to enable a person to input a code as a sequence of inputs to lock and unlock the vehicle door 12 by entering a programmed sequence of input characters (e.g., numbers) via pads 22 labelled with the identifier characters.

The input pad assembly 20 is illustrated further in FIG. 2 having the plurality of user selectable input pads 22 shown arranged horizontally in the driver side door window 16, according to one embodiment. The input pads 22 include fluorescent patterns in the form of keypad indication characters 58 that are illuminable with light of a certain wavelength to display a lighted character image that is viewable on the outside surface of the window 16. The input pads 22 each define a region upon which a user may touch the input pad with a finger or come in close proximity thereto to provide an input selection. The lighted characters 58 may be formed of a fluorescent ink, such as a security ink, that is essentially transparent and non-viewable in normal ambient lighting conditions. As such, the characters 58 are essentially invisible to a person until illuminated with light of a certain wavelength such as ultraviolet (UV) and/or infrared (IR) light. The characters 58 shown include numerical characters one and two (1•2) for the first input pad, numerical characters three and four (3•4) for the second input pad, numerical characters five and six (5•6) for the third input pad, numerical characters seven and eight (7•8) for the fourth input pad, and numerical characters nine and zero (9•0) for the fifth input pad. It should be appreciated that other characters such as letters or symbols may be employed as input pad identifiers. Each of the input pads 22 has a capacitive sensor that senses contact or close proximity (e.g., 1 millimeter) of the user's finger with the pad 22 and defines a binary switch output (on or off) indicative a user selection of that corresponding input pad.

The input pads 22 each include a proximity sensor positioned within the glass window for sensing close proximity of a user, such as a user's finger, in relation to the input pad. When a user 30, such as a user's finger 32, is detected in close proximity to one of the input pads, all of the input pads 22 may be lighted a green first color, according to one example, by the light source illuminating UV or IR radiation onto the fluorescent patterns 58 and thus viewable to a user. The illumination of all of the input pads 22 may be based on a first or lower threshold limit being exceeded by a signal generated by any one or more of the proximity sensors. When a proximity sensor associated with one of the inputs pads detects a finger in closer proximity with a higher threshold signal, indicative of an attempted activation of the input pad, a switch output may be generated and a feedback lighted output may be generated to illuminate that activated input pad to indicate that the input pad has been activated. This may include activating the input pad or lighting the input pad in a red second color, according to one example. If the user 30 performs a wrong touch on one or more of the input pads 22 or if an incorrect code is entered in the input sequence, one or more of the input pads 22 may be illuminated in a third color, such as amber, for example.

The input pad assembly 20 is further illustrated in FIG. 3 in more detail showing five proximity sensors configured as capacitive sensors 40 positioned to sense an object contacting or in close proximity to the corresponding input pads 22. As seen in FIG. 3, each of the capacitive sensors 40 includes a first electrode 42 and a second electrode 44. Each of the first and second electrodes 42 and 44 includes a plurality of conductive electrode fingers 52 and 54, respectively. As such, the first electrode 42 has a first plurality of electrode fingers 52 and the second electrode 44 has a second plurality of electrode fingers 54. Each of the first and second electrode plurality of fingers 52 and 54 are generally positioned to be interdigitated or interlaced with the other of the first and second plurality of electrode fingers 52 and 54 to at least some degree to generate a capacitive activation field for sensing the presence of an object such as a user's hand or finger. The first electrode 42 may be configured as a receive electrode and receives a sense signal, and the second electrode 44 may be configured as a drive electrode to receive a drive signal.

The capacitive sensors 40 each provide a capacitive sense activation field to sense contact or close proximity (e.g., within one mm) of a user (e.g., finger) in relation to the corresponding capacitive sensor. The capacitive sense activation field of each capacitive sensor 40 detects a user's finger which has electrical conductivity and dielectric properties that cause a change or disturbance in the capacitive sense activation field as should be evident to those skilled in the art. Each of the capacitive sensors 40 provides a sensed signal for a corresponding keypad 22 indicative of a user input. A user may enter a sequence of user inputs on the keypads 22 that match a programmed key code to lock or unlock one or more vehicle doors, according to one embodiment.

The capacitive sensors 40 each generally have the drive electrode 44 and the receive electrode 42, each having interdigitated fingers for generating a capacitive field. It should be appreciated that each of the capacitive sensors 40 may be formed by printed conductive ink or by assembling preformed conductive circuitry onto a substrate. According to one embodiment, the drive electrode 44 receives square wave drive signal pulses applied at voltage $V_I$. The receive electrode 42 has an output for generating an output voltage $V_O$. It should be appreciated that the electrodes 42 and 44 and electrode fingers 52 and 54 may be arranged in various configurations for generating the capacitive fields as the sense activation fields, according to various embodiments.

The drive electrodes 44 receive drive input signals $V_I$ on drive lines 48. The capacitive sensors 40 have a common output line 46 for outputting the corresponding voltage $V_O$. It should be appreciated that the drive and receive electrodes may be otherwise configured so that other types of single electrode or other multiples of electrode arrangements may be used. The capacitive input pad assembly 20 may advantageously be formed with conductive ink or may alternatively be formed with flex circuitry. The capacitive input pad assembly 20 may be applied to various types and sizes of input pads and characters.

In the embodiment shown and described herein, the drive electrode 44 of each capacitive sensor 40 is supplied with input voltage $V_I$ as square wave signal pulses having a charge pulse cycle sufficient to charge the receive electrode 42 to a desired voltage. The receive electrode 42 thereby serves as a measurement electrode. The adjacent sense activation fields generated by adjacent capacitive sensors may overlap slightly or overlap may not exist. When a user or operator, such as a user's finger enters a capacitive sense activation field, the corresponding capacitive sensor detects a disturbance caused by the finger to the activation field and determines whether the disturbance is sufficient to generate an input with the corresponding capacitive sensor. The disturbance of the activation field is detected by processing the charge pulse signal associated with the corresponding signal channel for that capacitive sensor. Each capacitive sensor 40 has its own dedicated signal channel generating a distinct charge pulse signal which may be processed individually.

Figure 5:
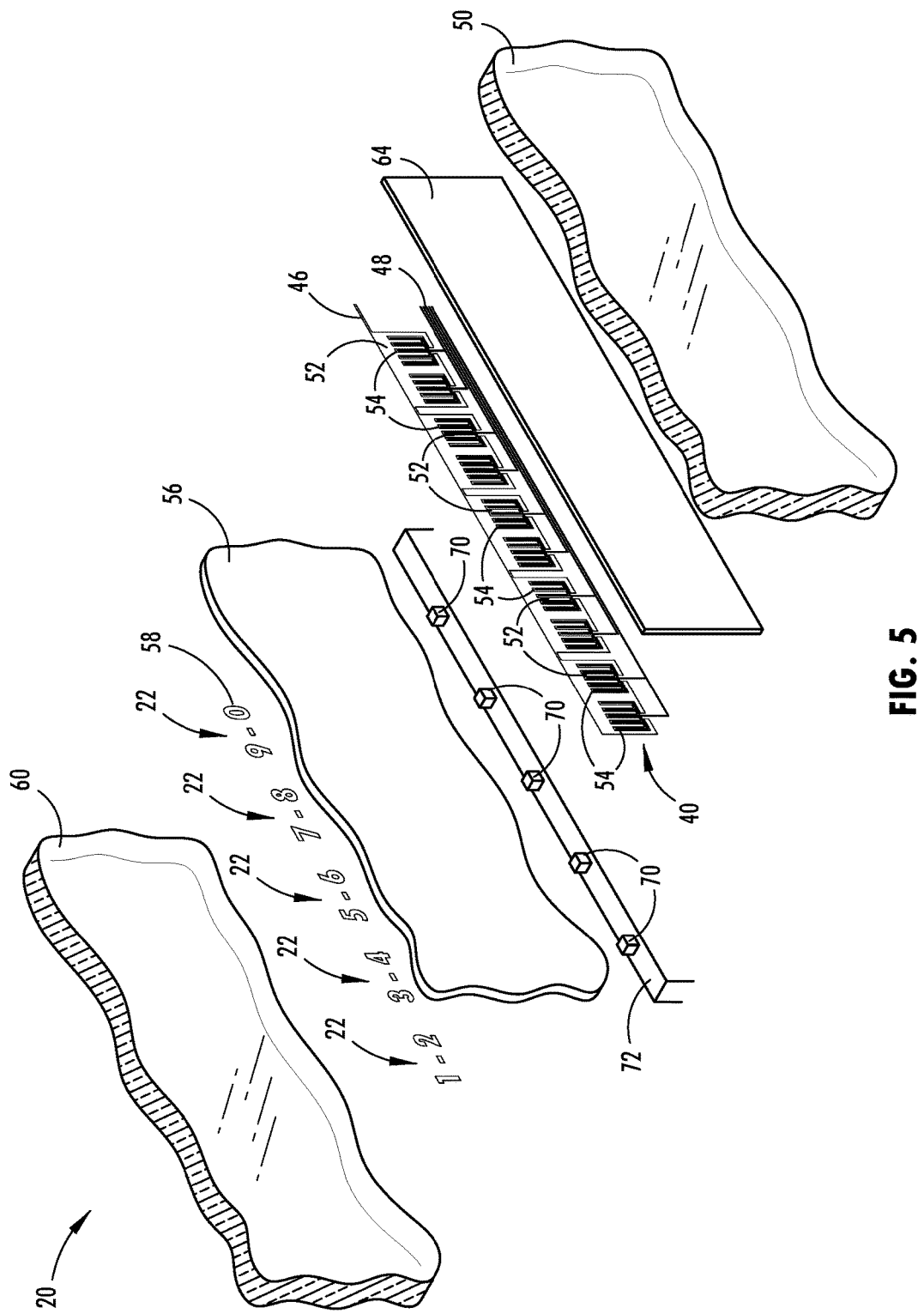
FIG. 5 is an exploded view of the capacitive input keypad assembly illustrated in FIG. 4A.

Referring to FIGS. 4A and 5, the input pad assembly 20 is further shown formed within the glass window 16 sandwiched between the outer glass layer 50 and the inner glass layer 60. The input pad assembly 20 includes a transparent polymeric or plastic layer 56 which may be a polymid layer in the shape of a sheet extending between the outer and inner glass layers 50 and 60. The polymid layer 56 may have a thickness of approximately one millimeter or less, according to one example. The polymid layer 56 is transparent and is light transmissive such that it operates as a light pipe to transmit light emitted from the light sources to the fluorescent patterns or characters 58. Disposed between the polymid layer 56 and the outer glass layer 50 is a UV/IR blocking layer 64 and the proximity sensors 40. The proximity sensors 40 may be formed with a film of indium tin oxide (ITO). The ITO forming the proximity sensors 40 may be formed as an ink printed onto the front surface of the polymid layer 56, according to one embodiment. The ITO may be deposited as a thin film onto the polymid layer 56 and may have a thickness of about 1000 to 3000 angstroms to form a transparent electrical conductor. The UV/IR blocking layer 54 serves to block ultraviolet and infrared radiation from penetrating from outside the vehicle through the window 16 and onto the fluorescent pattern 58 to prevent activation of the fluorescent material by sunlight. The ITO layer forming the proximity sensors 40 is a light transmissive medium that can be used to form the electrodes and signal lines for forming the proximity sensors. As such, the proximity sensors 40 will remain substantially invisible to a user looking through the window 16. In other embodiments, other transparent or semi-transparent or visible conductive inks or films may be used to form the proximity sensors 40.

Disposed between the polymid layer 56 and the inner glass layer 60 are the fluorescent characters 58 that may be printed in a fluorescent pattern with a security ink to define characters. The fluorescent pattern may be an ink, such as a security ink, that illuminates visible light when activated by ultraviolet radiation at a wavelength in the range of 200 to 400 nm or infrared radiation at a wavelength in the range of 700 to 1400 nm. It should be appreciated that the fluorescent characters 58 may otherwise be formed on another medium proximate to the polymid layer 56, according to other embodiments. The fluorescent pattern may be formed of a security ink that is a transparent ink that is generally invisible to the eyes of a person except when illuminated by ultraviolet or infrared radiation. The security ink can be printed onto a clear film and then attached to the polymid layer 56 or alternatively can be printed directly onto the polymid layer 56 or etched into the polymid layer 56 in the shape of the character(s). The fluorescent character may include up-converting phosphors which are microscopic ceramic powders that convert invisible infrared light wavelengths to visible colored light. The up-converting phosphors exhibit an anti-stokes shift that separates emission peaks from the infrared excitation source. The phosphors light up when illuminated with an infrared light, according to one embodiment. Up-converting phosphors can emit visible green, red, orange or blue colors when illuminated with an infrared illumination. Similarly, UV ink may be employed to form the fluorescent character and is illuminable to a visible light color when illuminated with ultraviolet light. It should be appreciated that both IR and UV illuminable fluorescent inks are commercially available, such as the type used for security ink.

The fluorescent characters 58 are located near a lower edge of the window 16, according to one embodiment. This allows for edge lighting LEDs 70 to be located within the door near the bottom edge of the window 16. The edge lighting LED 70 may be formed on an LED board 72, such as a printed circuit board. Each of the edge lighting LEDs 70 are aligned with one of the input pads 22 and the associated fluorescent characters 58. The edge lighting 70 may selectively generate ultraviolet radiation and infrared radiation which is transmitted through the polymid layer 56 to illuminate the fluorescent patterns or characters 58. As such, the edge lighting LEDs 70 are spaced sufficiently apart from one another and aligned so as to generate a light output that illuminates the corresponding fluorescent characters 58 without interfering with other fluorescent characters. As such, certain select LEDs may be illuminated one at a time with either infrared or ultraviolet light to generate a desired color output from the fluorescent characters 58.

Referring to FIG. 4B, the input pad assembly 20 is shown having the fluorescent characters 58 and the addition of optics 90 for directing the light onto the fluorescent characters 58, according to another embodiment. In this embodiment, the fluorescent characters 58 are located on the outer surface of the polymid layer 58 between the polymid layer 56 and the outside glass layer 50 and the optics 90 are etched into the inner surface of the polymid layer 56. The optics are arranged to push or redirect light generated by the edge lighting LEDs 70 outwards toward the outside window glass directly behind the corresponding character 58. As such, UV and IR light emitted from the edge lighting LEDs 70 is redirected by the optics 90 through the fluorescent characters 58 to give potentially enhanced lighting. The optics 90 may be formed by laser etching the surface of the polymid layer 64, according to one embodiment. In other embodiments, the optics 90 may be formed by roughening the surface to create grooves that reflect the light.

In addition, the input pad assembly 20 may include an optional titanium dioxide coating on the outside surface of the window glass applied onto the outer glass layer 50. The titanium dioxide coating may create a photocatalytic reaction to naturally erode the build-up of fingerprints on the glass window by allowing the window to be cleaned by UV light emitted from the sun. Additionally, the UV light source in the edge lit LEDs 70 may be illuminated to output UV light for a time period, such as twenty (20) minutes, after keypad inputs, to energize a photocatalytic reaction to erode the build-up of fingerprints on the glass window. Such illumination may take place the next time the car is unoccupied, particularly when there is low sunlight or no sunlight. It should further be appreciated that the sensitivity of the proximity sensors may be configured such that actual contact of the finger onto the input pad 22 is not required, which will further eliminate the need for eroding fingerprints on the glass window. Enhanced sensitivity of the proximity sensors can be achieved by employing a thin outer glass layer such as in the thickness of 1 to 1.5 millimeters.

The fluorescent characters 58 on the input pads 22 are generally invisible to a person when viewed from the outside of the window. When a user moves a finger into contact or close proximity to one or more of the input pads 22, all of the input pads 22 are illuminated in a first green color by activating the UV light source for each of the LEDs 70 to illuminate each of the fluorescent characters 58. When a user further contacts one of the input keypads to make an activation, the IR light source of the LED lights 70 associated with that corresponding input pad is illuminated to illuminate that inputted fluorescent character 58 at that input pad 22 to generate a second red color light at that input pad. If two or more input pads 22 are wrongly activated at the same time, both the UV and IR LEDs associated with the activated keypads are activated at the same time so as to generate a third amber color light for those input wrongly activated input pads. This is because the red and the green light combine together will form the third amber color.

Figure 6:
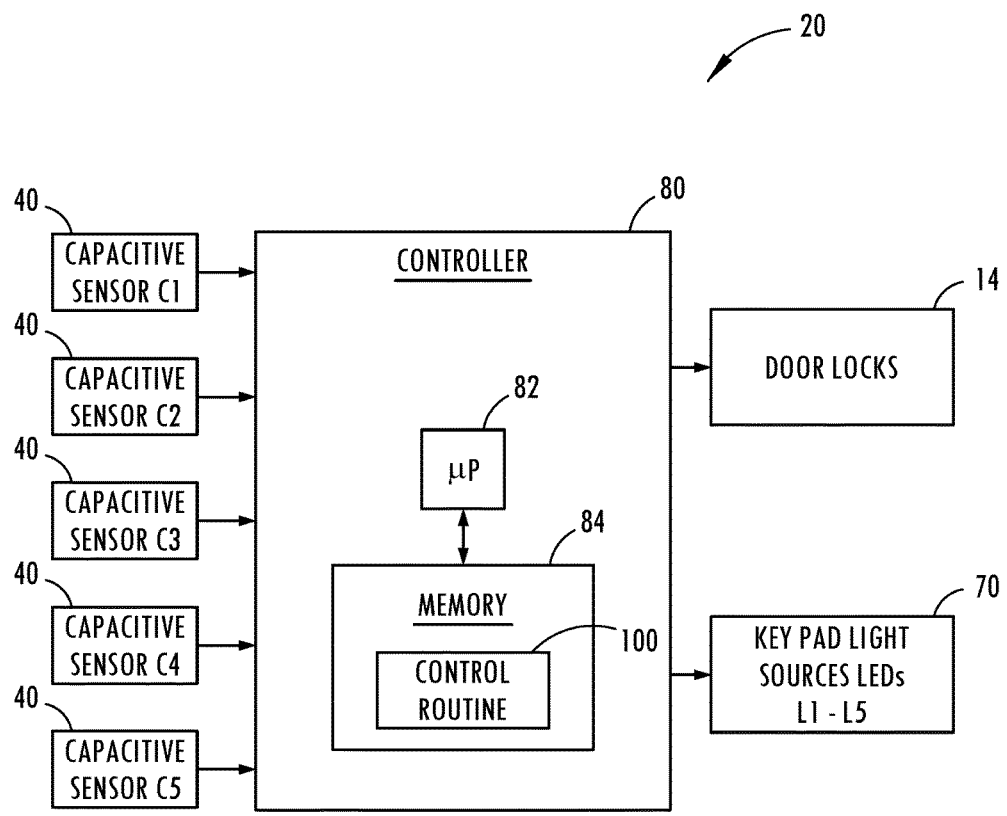
FIG. 6 is a block diagram illustrating controls for processing keypad inputs and controlling the door locks and lighting arrangement.

Referring to FIG. 6, the capacitive keypad input assembly 20 is illustrated according to one embodiment. The plurality of capacitive sensors 40 is shown providing respective inputs to a controller 80, such as a microcontroller. The controller 80 may include circuitry, such as a microprocessor 82 and memory 84. The control circuitry may include sense control circuitry processing the activation filed of each capacitive sensor to sense user activation by comparing the activation field signal to one or more thresholds pursuant to a control routine 100. It should be appreciated that other analog and/or digital control circuitry may be employed to process each capacitive activation field, to determine user activation, and initiate an action. The controller 80 may employ a Q matrix acquisition method available by ATMEL®, according to one embodiment. Exemplary capacitive sensors are described in the Apr. 9, 2009, ATMEL® Touch Sensors Design Guide 10620 D-AT42-A4/09, the entire reference hereby being incorporated herein by reference.

The controller 80 may include an analog to digital (A/D) comparator integrated within or coupled to the microprocessor 82 which may receive the voltage output $V_O$ from each of the capacitive sensors, convert the analog signal to a digital signal, and provide a digital signal to the microprocessor 82. The controller 80 may include a pulse counter integrated within or coupled to the microprocessor 82 that counts the charge signal pulses that are applied to each drive electrode of each proximity sensor, performs a count of the pulses needed to charge the capacitor until the voltage output $V_O$ reaches a more predetermined voltage, and provides the count to the microprocessor 82. The pulse count is indicative of the change in capacitance of the corresponding capacitive sensor. The controller 80 may provide a pulse width modulated signal to a pulse width modulated drive buffer to generate the square-wave pulse which is applied to each drive electrode of each capacitive sensor. The controller 80 may process the received signals and make a determination as to activation of one of the capacitive sensors and generates one or more signals to activate one or more of the edge lighting LEDS 70 to illuminate UV and/or IR light to one or more of the fluorescent characters 58 to generate a desired color lighting. The controller 80 may further determine whether a sequence of user inputs matches a programmed code and unlock or lock the vehicle doors when the code is matched by the sequence of inputs.

Figure 7:
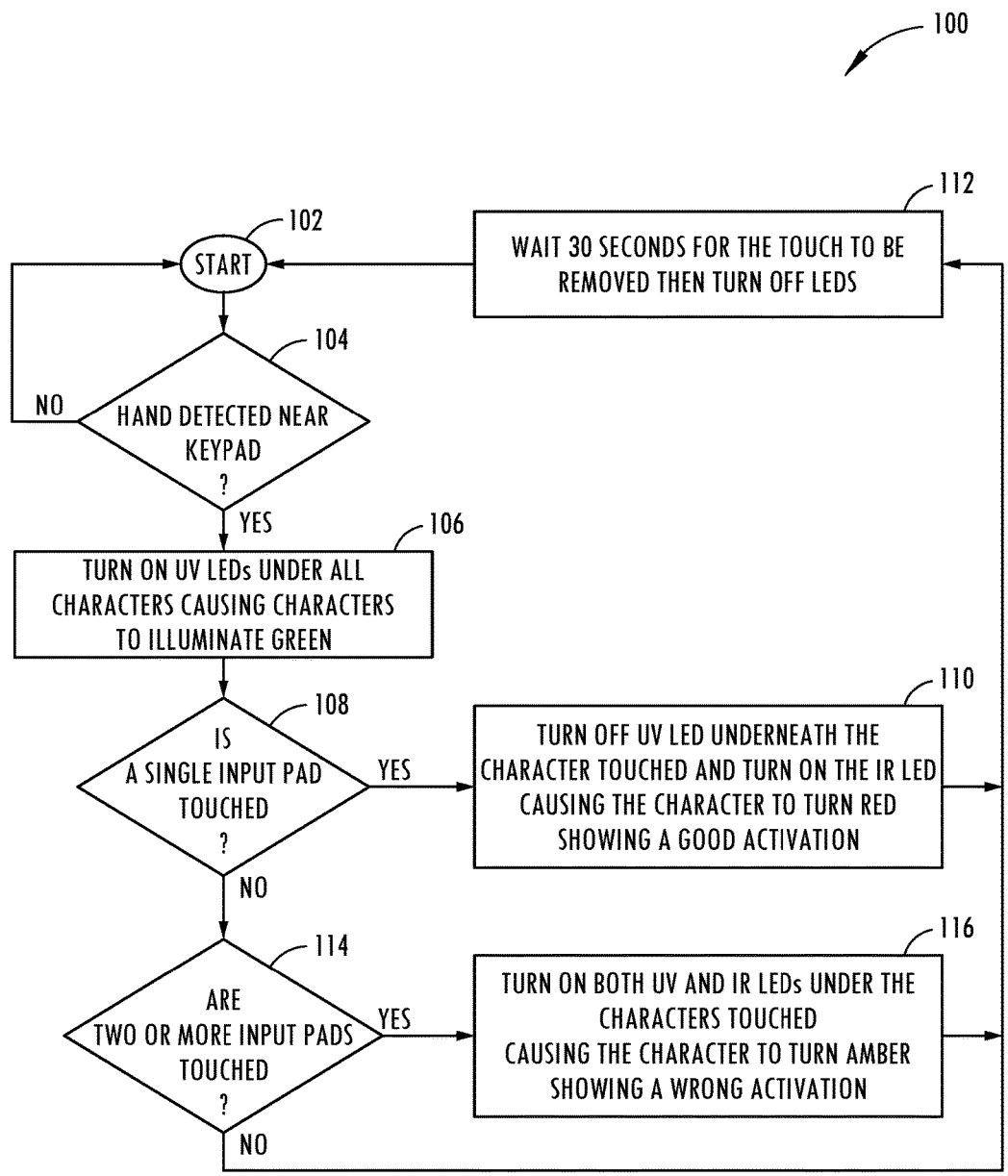
FIG. 7 is a flow chart illustrating a routine for controlling the keypad lighting.

Referring to FIG. 7, the control routine 100 for controlling illumination of the input pad assembly is illustrated, according to one embodiment. The control routine 100 starts at step 102 and proceeds to decision step 104 to determine if a hand is detected near the keypad and, if not, cycles back and waits for a hand detection. Once a hand is detected, routine 100 proceeds to step 106 to turn on the UV edge lighting LEDs under all characters causing the characters to illuminate a green color. Next, at decision step 108, routine 100 determines if a single input pad has been touched. If a single input pad has been touched, at step 110 routine 100 turns off the UV LED underneath the character touched and turns on the IR LED associated with the touched input pad causing the character to turn a red color indicative of good activation. Thereafter, routine 100 waits for a time period such as thirty (30) seconds for the touch to be removed and then turns off the LEDs as step 112 before returning. If a single input pad was not touched, routine 100 proceeds to decision step 114 to determine if two or more input pads were touched. If two or more input pad were touched, routine 100 proceeds to step 116 to turn on both the UV and IR LEDS underneath the characters of the touched input pad, thereby causing the characters to turn an amber color indicative of a wrong activation. Thereafter, routine 100 proceeds to step 112 to wait thirty (30) seconds for the touch to be removed and then turns off the LEDs before returning.

Accordingly, the input pad assembly 20 advantageously provides for enhanced user activatable input keypads in a window of a vehicle. The assembly is substantially transparent when not in use and may be activated in different colors to enable proper operation of the input keypad assembly.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An input pad assembly comprising:
   a light transmissive medium comprising a window;
   a proximity sensor positioned on the medium;
   a fluorescent pattern located on the medium; and
   a light source positioned outside of the window near an edge to edge light the window and illuminate the fluorescent pattern.

2. The input pad assembly of claim 1, wherein the medium comprises a first glass layer and a second glass layer, wherein the sensor and pattern are located between the first and second glass layers.

3. The input pad assembly of claim 1, wherein the window is a vehicle door window.

4. The input pad assembly of claim 1, wherein the light source comprises at least one of an ultraviolet and infrared light source.

5. The input pad assembly of claim 1, wherein the pad assembly is employed on a vehicle.

6. The input pad assembly of claim 5, wherein the input pad assembly is employed as a keypad assembly to control operation of a door lock to lock or unlock a vehicle door.

7. The input pad assembly of claim 1 further comprising optics operatively coupled to the light transmissive medium for directing light towards the fluorescent pattern.

8. A vehicle input pad assembly comprising:
   a vehicle window comprising a first layer and a second layer;
   a proximity sensor positioned between the first and second layers;
   an illuminable fluorescent pattern positioned between the first and second layers; and
   a light source positioned outside of the window near an edge to edge light the window and illuminate the fluorescent pattern.

9. The input pad assembly of claim 8, wherein the window comprises a movable vehicle door window, and the light source is positioned to edge light the window and the fluorescent pattern through the window.

10. The input pad assembly of claim 8, wherein the light source comprises at least one of an ultraviolet and infrared light source.

11. The input pad assembly of claim 8, wherein the input pad assembly is employed as a keypad assembly to control operation of the door lock to lock or unlock a vehicle door.

12. The input pad assembly of claim 8, wherein the first layer and the second layer each comprise glass.

13. A vehicle input keypad assembly comprising:
   a vehicle window comprising first and second glass layers;
   a proximity sensor positioned between the first and second glass layers;
   a fluorescent illuminable pattern positioned between the first and second layers; and
   a light source positioned outside of the window near an edge to edge light the window and illuminate the fluorescent illuminable pattern.

14. The input pad assembly of claim 13, wherein the window comprises a vehicle door window, and the light source is positioned to edge light the window and the fluorescent pattern through the window.

15. The input pad assembly of claim 13, wherein the light source comprises at least one of an ultraviolet and infrared light source.

16. The input pad assembly of claim 13, wherein the input pad assembly is employed as a keypad assembly to control operation of the door lock to lock or unlock a vehicle door.

17. The input pad assembly of claim 13 further comprising a light transmissive medium disposed between the first and second glass layers to transmit light to the pattern.

18. The input pad assembly of claim 17 further comprising optics operatively coupled to the light transmissive medium for directing light towards the fluorescent pattern.

\* \* \* \* \*